Figure 1:
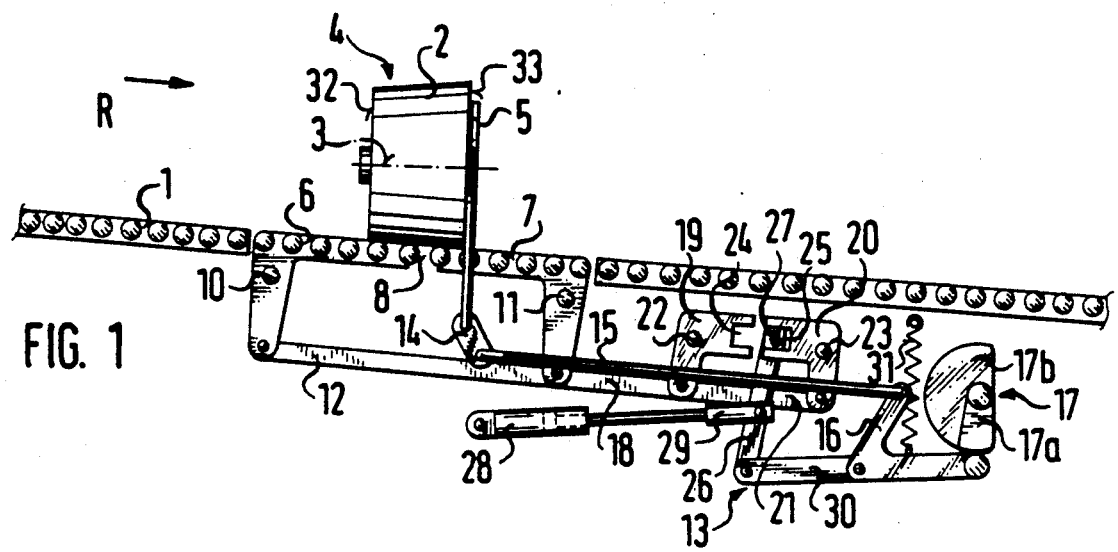

United States Patent [19]

Raasch et al.

[11] Patent Number: 5,025,911
[45] Date of Patent: Jun. 25, 1991

[54] METHOD AND APPARATUS FOR TILTING SUBSTANTIALLY ROTATIONALLY SYMMETRICAL BODIES SUCH AS CROSS-WOUND BOBBINS

[75] Inventors: Hans Raasch, Mönchengladbach; Hans Müllenberg, Erkelenz, both of Fed. Rep. of Germany

[73] Assignee: W. Schlafhorst AG & Co., Mönchengladbach, Fed. Rep. of Germany

[21] Appl. No.: 500,680

[22] Filed: Mar. 28, 1990

[30] Foreign Application Priority Data

Mar. 28, 1989 [DE] Fed. Rep. of Germany ....... 3909966

[51] Int. Cl.$^5$ ............................................. B65G 47/24
[52] U.S. Cl. .................................... 198/400; 198/395; 198/407; 414/774
[58] Field of Search ............... 198/399, 400, 395, 407; 414/757, 774

[56] References Cited

U.S. PATENT DOCUMENTS

| 2,935,173 | 5/1960 | Cozzoli . |
| 3,954,170 | 5/1976 | Schlough . |
| 4,565,278 | 1/1986 | Asai et al. ........................ 198/400 |
| 4,706,798 | 11/1987 | Hollmann . |
| 4,907,686 | 3/1990 | Cotic .............................. 198/399 |

FOREIGN PATENT DOCUMENTS

| 0113125 | 7/1984 | European Pat. Off. . |
| 0164648 | 12/1985 | European Pat. Off. . |
| 3742112 | 6/1988 | Fed. Rep. of Germany . |
| 3707553 | 9/1988 | Fed. Rep. of Germany . |
| 3824874 | 2/1989 | Fed. Rep. of Germany . |
| 3742220 | 4/1989 | Fed. Rep. of Germany . |
| 920763 | 3/1963 | United Kingdom . |

Primary Examiner—Joseph E. Valenza
Attorney, Agent, or Firm—Herbert L. Lerner; Laurence A. Greenberg

[57] ABSTRACT

The method and apparatus is used for tilting substantially rotationally symmetrical bodies, such as frusto-conical bobbin bodies, from a shell surface thereof onto an end surface thereof. The body is moved in a given transport direction defining leading and trailing end surface of the body with the shell surface lying on a conveyor path. The movement continues until the body crosses a dividing palne. The dividing plane extends transversely between and defines edges of two path segments of the conveyor path. The body is stopped when the leading and trailing end surfaces are supported on different path segments. The edge of one of the path segments is subsequently selectively raised relative to the other of the path segments. The body is tilted about the riased edge onto the other of the path segments until the end surface located above the other of the path segments comes to rest on the other of the path segments. The tilted body is removed in the given transport direction.

22 Claims, 2 Drawing Sheets

METHOD AND APPARATUS FOR TILTING SUBSTANTIALLY ROTATIONALLY SYMMETRICAL BODIES SUCH AS CROSS-WOUND BOBBINS

SPECIFICATION

The invention relates to a method and an apparatus for tilting substantially rotationally symmetrical bodies, in particular frustoconical bobbin bodies, from a shell or jacket surface or cone generatrix onto an end surface thereof, wherein the bodies are deliverable to a turning point on a conveyor path.

During production, cross-wound bobbins or cheeses as a rule are set down with the shells, jackets, circumferential surfaces or cone generatrices thereof lying on a conveyor belt in the machine. It is desirable for the bobbins to be delivered upright, or in other words supported on one end surface, to other conveying or packaging stations. In such a process care must be taken to ensure that all of the bobbins are aligned equally in terms of their pay-out direction. Frustoconical bobbins should therefore all be repositioned the same way so that they rest on the larger end thereof.

Rotor spinning machines that make cheeses as a rule are constructed as two-sided machines, with bobbins that are disposed on a central conveyor belt or on each of their conveyor belts and have to be tilted about their radial axes in alternating directions, so that all of the tilted bobbins will have the same pay-out direction.

In order to reorient bobbins, so-called manipulators have often been used in the past, such as in Published European Application Nos. 0 113 125 and 0 164 648, where the bobbin body to be reoriented is engaged by a passing tool and turned or inverted. However, such manipulators entail considerable structural expense as well as adaptation of the tools and curves of motion to the particular size and shape of the bodies to be manipulated.

A tilting configuration is also known that has a slide. The fall of the bobbin is controlled with the aid of flaps, so that the bobbin is always turned toward one side with respect to the delivery direction. For the above-described case in which a change in the tilting direction is necessary, two tilting devices working in opposite directions are always needed. Additionally, the bobbins are allowed to fall relatively unchecked, which results in a high risk of damage.

It is accordingly an object of the invention to provide a method and apparatus for tilting substantially rotationally symmetrical bodies such as cross-wound bobbins or cheeses, which overcome the hereinafore-mentioned disadvantages of the heretofore-known methods and devices of this general type and which permit reliable, gentle, selective tilting of the bodies in two directions, largely independently of the size and shape of the body to be tilted.

With the foregoing and other objects in view there is provided, in accordance with the invention, a method for tilting substantially rotationally symmetrical bodies, such as frustoconical bobbin bodies, lying on a shell surface or cone generatrix thereof onto an end surface thereof, which comprises:

a) moving the body lying horizontally on the conveyor path, until the projection of the axis of rotation of the body extending parallel to the conveyor direction, passes through a transversely extending dividing plane between two path segments;

b) stopping the body when the leading end thereof is supported by the front end surface on one path segment and the trailing end thereof is supported by the rear end surface on the other path segment;

c) subsequently selectively raising the edge of one of the two path segments adjoining the dividing plane relative to the other path segment, and tilting the body about the raised edge onto the other path segment until the end surface located above the latter path segment comes to rest on its surface; and d) removing the tilted body on its end surface from the vicinity of the tilting site.

With the objects of the invention in view, there is also provided an apparatus for tilting bodies, such as frustoconical bobbin bodies, lying on a shell surface or cone generatrix thereof onto one of two opposite end surfaces thereof, comprising a conveyor path being divided into two segments transversely to the conveying direction in the vicinity of a turning point, each of the segments having a parallel tilting edge together defining the dividing line and forming a flush bearing surface for the bodies to be tilted in a position of repose; stop means being shiftable into the path of motion of the body in such a way that the body can be stopped approximately centrally above the dividing line, with the leading end having the front end surface resting above one conveyor path segment and the trailing end having the rear end surface resting above the other conveyor path segment; the transversely extending tilting edges each being raisable alternatively with respect to the other tilting edge, in order to tilt the body resting on the opposed conveyor path segment about the raised tilting edge, in such a manner that the end surface is placed on the conveyor path segment located below it.

If the tilting edge located forward of the dividing line is raised, then the body is tilted about a transverse axis in the conveying direction. In contrast, when the rear tilting edge is raised, the body is turned counter to the conveying direction and is inverted onto its rearward end surface. The tilting is effected largely independently of the size and shape of the body to be tilted or reoriented. One particular advantage of the invention is that upon tilting or turning, the body is continuously supported by one edge on the conveyor path segment on which its end surface rests once the tilting operation is completed. This assures a gentle rolling motion during the tilting and precludes damage from impact of the body during the tilting.

In principle, the invention can be achieved by raising the particular selected tilting edge with or without motion coupling of the conveyor path segment located on the same side of the dividing line.

However, even gentler turning of the body along with increased reliability can be achieved if, in accordance with another mode of the invention, there is provided a method which comprises tilting the body by pivoting the two transport path segments in the same pivoting direction about two parallel pivot pins extending transversely to the given conveying direction, so that the tilting edge of the one or active path segment is raised and the tilting edge of the other or passive path segment is lowered relative to the position of repose.

In accordance with a further mode of the invention, there is provided a method which comprises pivoting the two conveyor path segments synchronously. The advantage of a synchronous pivoting of the two conveyor path segments is that it causes the conveyor path segment receiving the body to already move toward the applicable end surface during the tilting motion of the body. During the entire tilting operation, the body continues to be supported on the tilting edge by its own weight, so that in all phases the tilting is effected in a controlled and positionally correct manner.

In accordance with an added mode of the invention, there is provided a method which comprises pivoting the two conveyor path segments back into a starting position in a direction parallel to the given conveying direction, before removing the tilted body. Therefore, once the applicable end surface has been placed on the receiving segment, both conveyor path segments are synchronously pivoted back again into the position of repose. Then, optionally even shortly before the position of repose is reached, the turned body is removed from the turning zone, preferably on the adjoining part of the conveyor path, in the same conveying direction.

In accordance with an additional mode of the invention, there is provided a method which comprises radially guiding the body with the edge of the one path segment during tilting and/or pivoting back. The conveyor path is preferably provided with suitable lateral guides to stabilize the rotationally symmetrical body in the conveying direction.

In accordance with yet another mode of the invention, there is provided a method which comprises moving a mechanical stop into the conveyor path after removing a tilted body, and moving the mechanical stop out of the conveyor path when beginning to raise the edge of the one path segment.

In accordance with yet a further mode of the invention, there is provided a method which comprises tracing the body to be tilted and determining the end surface onto which the body is to be tilted according to a predetermined selection criterion no later than arrival of the body at the at the dividing plane, and selecting which path segment edge is to be raised as a function of the selection criterion for tilting the body onto the end surface determined by the selection criterion.

In accordance with a concomitant mode of the invention, there is provided a method which comprises selecting the larger end surface of the frustoconical body as the end surface to rest on the other of the path segments after tilting the body.

In accordance with another feature of the invention, the conveyor path is a roller conveyor and the tilting edges are rollers having parallel bearing shafts, the rollers defining the conveyor path segments at the dividing line.

In accordance with a further feature of the invention, the conveyor path segments are pivot vanes having mutually parallel pivot pins extending transversely to the given conveying direction.

In accordance with an added feature of the invention, there are provided means for operatively coupling and synchronously pivoting the pivot vanes in the same pivoting direction.

In accordance with an additional feature of the invention, the pivot vanes have substantially parallel bearing surfaces Both the lateral guides and the central bearing surfaces of the conveyor path can be constructed in the form of rollers, which are supported on transverse axes. The two tilting edges may also have a concave curvature, in order to lend lateral support to the body supported by the tilting edge on the lateral surface. An essential feature is that both tilting edges have a general extension that is transverse to the conveying direction.

In accordance with yet another feature of the invention, the body has a transverse axis passing through the end surfaces thereof, the given conveying direction has a given inclination relative to the horizontal for accelerating motion of the bodies due to the force of gravity, and the bearing surface of the pivot vane forming the other of the conveyor path segments receiving the end surface of the turned body has an inclination opposite to the given inclination for limiting tilting of the body about the transverse axis of the body to less than 90°.

In accordance with yet a further feature of the invention, the conveyor path has a remaining portion adjoining the pivot vanes, and there are provided means for returning the pivot vanes to the position of repose after tilting the body, with the bearing surfaces of the two pivot vanes aligned with the remaining portion of the conveyor path.

In accordance with yet an added feature of the invention, the stop means are are operatively coupled to the two conveyor path segments.

In accordance with yet an additional feature of the invention, there is provided a tracer device for tracing the body along the given path of motion prior to reaching the stop means.

In accordance with a concomitant feature of the invention, there is provided a reversing device being actuated as a function of the tracer device for reversing the direction of motion of the two tilting edges.

Other features which are considered as characteristic for the invention are set forth in the appended claims.

Although the invention is illustrated and described herein as embodied in a method and apparatus for tilting substantially rotationally symmetrical bodies such as cross-wound bobbins or cheeses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
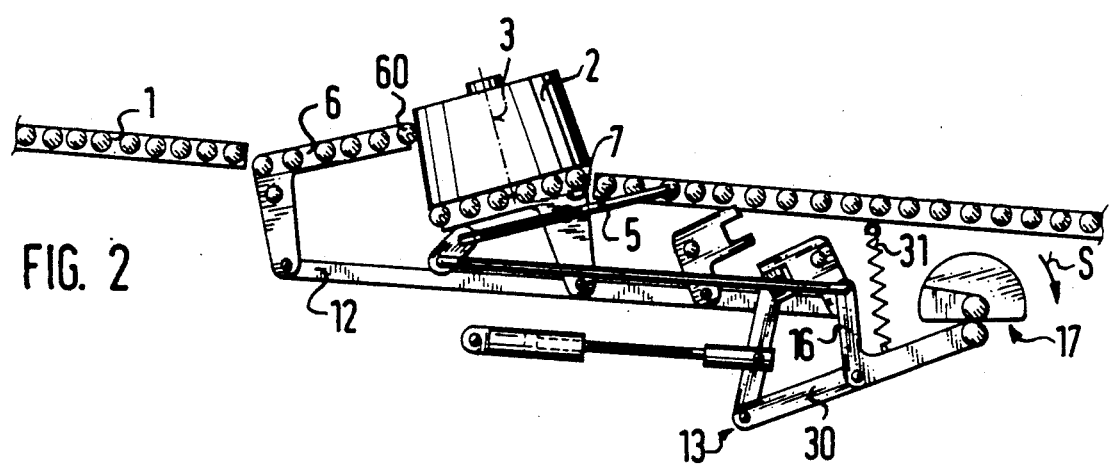
Figure 3:
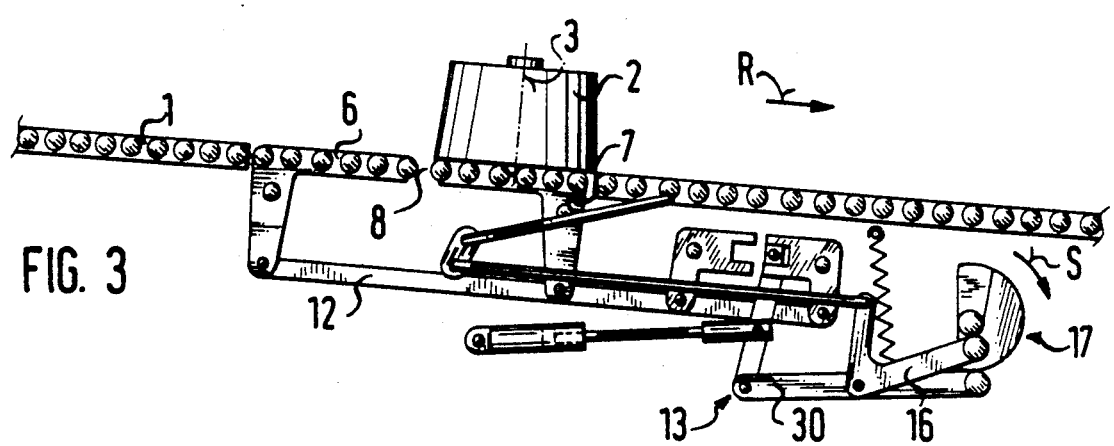
Figure 4:
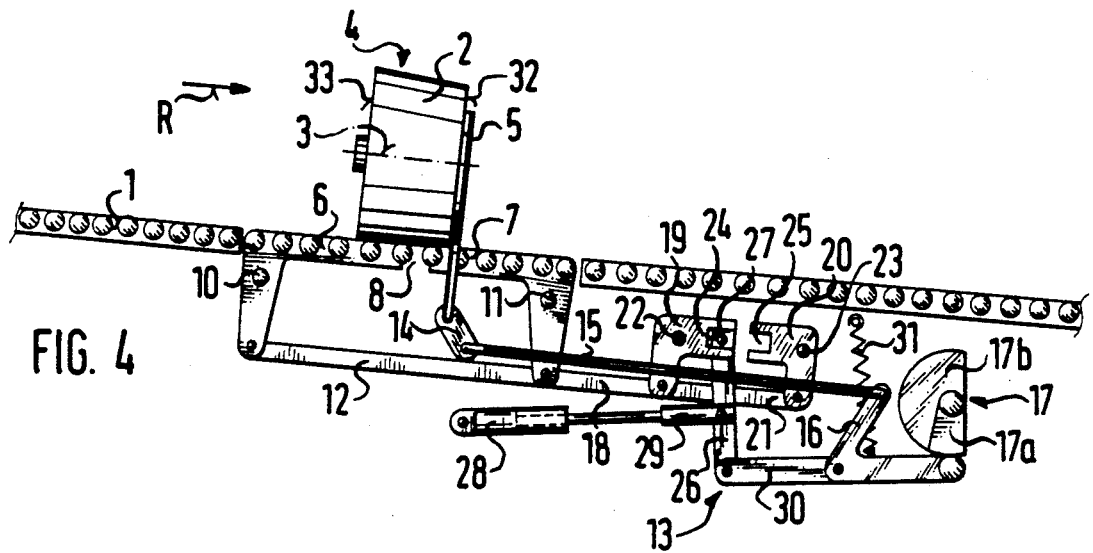
Figure 5:
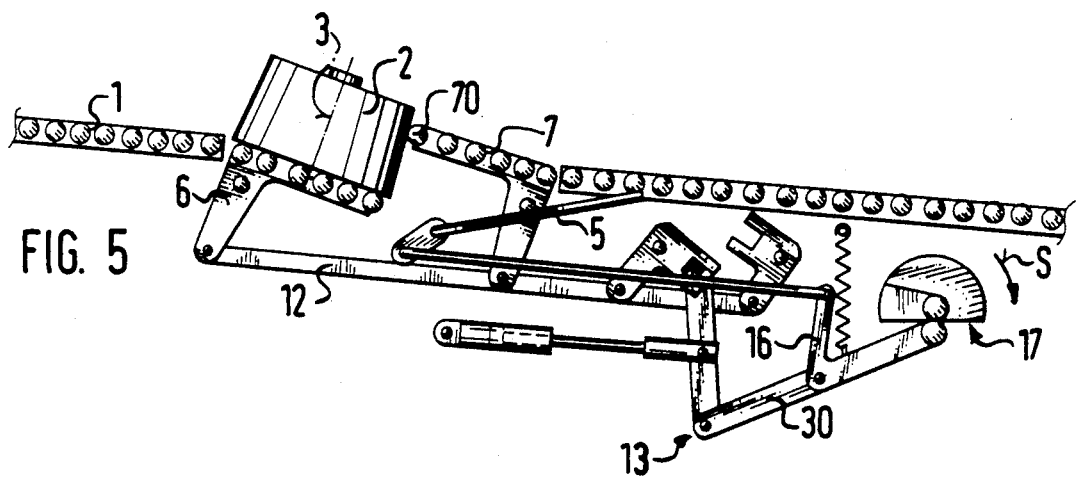
Figure 6:
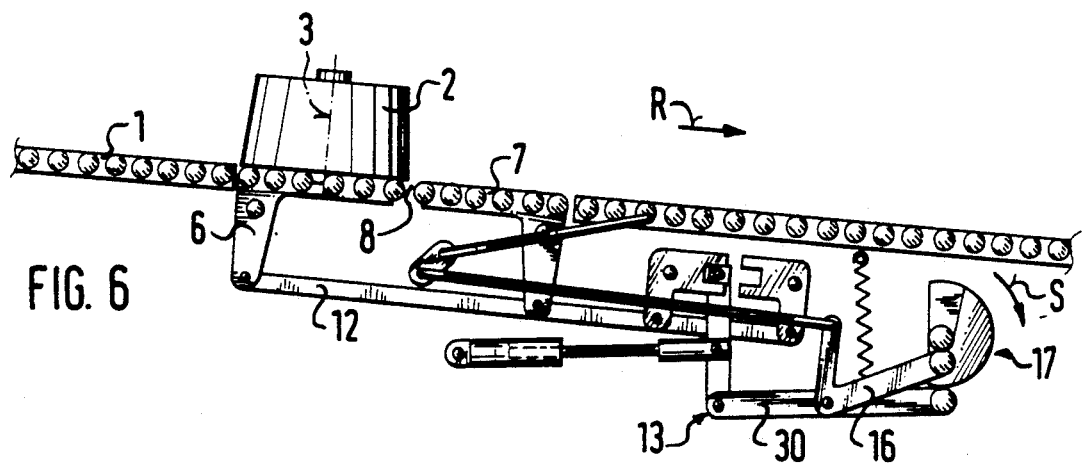

FIGS. 1-3 are fragmentary, diagrammatic, side-elevational views of the essential mechanical components of an exemplary embodiment of the invention as seen in various phases during the tilting of a frustoconical body in the conveying direction on an inclined roller conveyor serving as a transport path; and FIGS. 4-6 are views similar to FIGS. 1'3 showing the components of FIGS. 1-3 in various phases during the tilting of the body counter to the conveying direction.

Referring now to the figures of the drawing in detail and first, particularly, to FIG. 1 thereof, there is seen an inclined roller conveyor or body 1 which is shown as a bobbin conveyor path. Frustoconical cheeses or bobbin bodies 2 move on the roller conveyor 1 in a conveying direction R, while resting horizontally. The axis of rotation 3 of the frustoconical bobbin body, or more specifically its projection, extends parallel to the direction R. The bobbin or bobbin body 2 is maintained in a centered position on the roller conveyor 1 by inclined sliding surfaces or by suitably positioned lateral guide rollers along the central axis of the roller body 1.

The transport motion of the cheese 2 is interrupted by a tiltable stop in the vicinity of a turning point 4. In the vicinity of the turning point 4, the conveyor path 1 includes two pivoting vanes 6 and 7, having bearing surfaces which are withdrawn flush into the adjoining bearing surfaces of the roller conveyors 1, in the position of repose shown in FIG. 1. A transversely extending dividing line, plane or gap 8 remains between the pivoting vanes 6 and 7. The pivoting vanes 6 and 7 are pivotable about parallel pivot pins 10 and 11 that likewise extend transversely to the conveying direction R. The pivot pins 10 and 11 are attached to the machine frame. The actuating arms of the two pivoting vanes 6 and 7 are pivotably connected to one another through a connecting rod 12, while adjoining connecting members join the two motion-coupled pivot vanes 6 and 7 to a linkage 13 controlling the tilting operation. A stop 5 has a bearing shaft, which is also attached to the machine frame and is motioncoupled and controlled through a lever 14, a rod 15 and the linkage 13. The rod 15 is controlled through a cam lever 16 by a control cam 17a of a cam assembly 17, which is rotatable in the direction of an arrow S shown in FIG. 2 on a bearing shaft attached to the machine frame.

The pivoting position of the pivot vanes 6 and 7 is controlled by a further cam 17b of the cam assembly 17. To this end, one of the actuating arms of the two pivot vanes 6, 7, or the connecting rod 12 thereof, is connected through a connecting rod 18 to two forked levers 19 and 20. The two forked levers 19, 20 are pivotably connected to one another through a connecting rod 21 and each of the forked levers have a pivot bearing shaft 22, 23 connected to the machine frame. The ends of the forked levers facing one another each have a respective receiving slit 24, 25 formed therein. A sliding block 27 is disposed on the free end of a switch element 26. The sliding block engages either the receiving slit 25 associated with the right-hand forked lever 20 or the receiving slit 24 of the forked lever 19, depending upon the direction of the action of a bidirectional piston and cylinder configuration 28. The piston and cylinder configuration 28 is pivotably connected to the switch element 26 through a fork 29. The switch element 26 is pivotably connected to a cam lever 30, which runs or rolls on the control cam 17b. The two cam levers 16 and 30 are kept in contact with the cam assembly 17 through a spring assembly 31.

The operation of the above-described configuration during the tilting of frustoconical cross-wound bobbins 2, will now be explained. The frustoconical cross-wound bobbins or cheeses 2 are delivered to the turning point 4 by the roller conveyor 1 with a wide end surface 33 and a narrow end surface 32 alternately leading and they are always tilted onto the wide end surface 33 with the aid of the tilting apparatus.

In FIG. 1, the pivot vanes 6 and 7 are in a position of repose, in which they present a bearing surface to the side of the frustoconical bobbin body 2 resting thereon that is flush with the rest of the surface of the conveyor path. A tracing, scanning or detecting device is provided with LEDs (light emitting diodes) 34, 35 shown in FIGS. 1 and 4 that are disposed at a distance above the path 1 at which the wide end 33 of the bobbin will interrupt a beam of light to be detected by a sensor but the narrow end will not. The tracing device traces the body along the path of motion thereof and, when both beams are interrupted in succession, the tracing device senses that a bobbin has become centered over the dividing line 8. The tracing device also senses which edge is the leading edge by sensing which beam remains interrupted. Through the use of the tracing device, the bobbin body 2 is traced until it reaches the stopping position on the stop 5 shown in FIG. 1. As mentioned above, in this process the location of the end surface 33 having the larger diameter is determined. The stop 5 is disposed in such a way that the bobbin 2 is stopped at a point approximately centrally above the dividing line 8, with the leading end of the bobbin resting on the right-hand pivot vane 7 and the trailing end thereof resting on the left-hand pivot vane 6.

The tracer device controls the imposition of pressure by two chambers of the piston and cylinder configuration 28 to the left and right of the bidirectional piston. Thus a reversing device is provided by the elements 28, 26, 27 which is actuated as a function of the tracer device for reversing the direction of motion of the two tilting edges 60. In FIG. 1, the bobbin body 2 is to be tilted clockwise transversely to the conveying direction R, and at the end of the tilting operation is to be inverted onto the conveyor path, with its end surface 33 of larger diameter resting thereon. The switch element 26 is shifted into the receiving opening 25 of the forked lever 20 by the piston and cylinder configuration 28. Subsequently, the tilting motion begins by rotation of the cam assembly 17 into the direction of rotation S. The control cam 17a, in cooperation with the spring assembly 31, causes the cam lever 16 to pivot. The control cam 17a pivots the stop 5 completely out of the conveyor path through the rod 15 and the lever 14, so that the bobbin 2 can intrinsically roll onward along the conveyor path 1. At the same time, however, the operatively coupled pivot vanes 6 and 7 are pivoted counter to the conveying direction, or in other words counterclockwise, about their respective pivot pins 10 and 11 into the position shown in FIG. 2. The linkage element combination 30, 26, 27, 20, 21, 18 and 12, under the influence of the control cam 17 and the spring assembly 31 that presses the cam lever 16 against the control cam, effects this pivoting motion. A roller 60 shown in FIG. 2 which adjoins the left side of the dividing line 8 and which has a roller axis extending transversely to the conveying direction R, acts as a tilting edge for the tilting bobbin body 2 upon counterclockwise pivoting and, during or after tilting into the position shown in FIG. 2, simultaneously prevents the bobbin body 2 from rolling counter to the conveying direction on the bearing surface on the pivot vane 7, which is then inclined in the opposite direction. Due to the synchronous counterclockwise pivoting of the receiving pivot vane 7, its bearing surface counteracts the (clockwise) tilting motion of the body 2 and partly absorbs this tilting motion. At the end of the tilting motion, the larger end surface 33 is placed on the bearing surface of the pivot vane 7.

Next, the pivot vanes 6 and 7 are pivoted back again, under the influence of the control cam 17b that continues to rotate clockwise, far enough that the upper surfaces thereof again form flush segments of the roller conveyor 1. As shown in FIG. 3, in accordance with the control cam 17a, the linkage elements associated with the stop 5 initially keep the stop in the downwardly pivoted position, so that the bobbin can be removed from the vicinity of the turning point 4 in the conveying direction R without hindrance. It is only once the bobbin 2 has been removed that the cam assembly 17 is rotated far enough that the stop 5 is again moved upright into the conveyor path, in order to intercept the next bobbin body in alignment with the dividing line 8.

A comparison of FIGS. 1–3 shows that during all of the functional phases of FIGS. 1–3, the piston and cylinder configuration 28 is kept in the disengaged position and the sliding block 27 is kept in the receiving slit 25. In the various functional phases during the clockwise tilting of the bobbin 2, the forked lever 20 is first pivoted downward and then upward about its bearing shaft 23 attached to the machine frame. Due to the kinematics of the linkage elements involved as shown, the consequence of this is that the coupling members 18 and 12 are first moved to the right in the drawing of FIG. 2 and are subsequently moved back again to the left into the position of repose shown in FIGS. 1 and 3.

FIGS. 4–6 show the above-described tilting apparatus during the tilting of a bobbin body counter to the conveying direction R, or in other words counterclockwise. The tracer device has already detected beforehand that the bobbin 2 has been conveyed over the roller conveyor 1 with its end surface 32 of smaller diameter leading. With this relative position of the bobbin 2 as well, the bobbin is stopped approximately centrally above the dividing line 8 by the stop 5. The piston and cylinder configuration 28 is retracted due to action exerted upon the other cylinder chamber, as a function of the tracer device. Correspondingly, the sliding block 29 is shifted into the receiving slit 24 of the left forked lever 19. Before the tilting motion begins, the stop 5 is pivoted downward out of the conveyor path in accordance with the description given above. By shifting the sliding block into the recess 24 and by incorporating the forked lever 19 into the linkage system, the coupling members 21, 18 and 12 are displaced to the left in the drawing. Upon the displacement of the actuating arms of the two pivot vanes 6 and 7 to the left, these vanes pivot clockwise. During this process the bobbin 2 is tilted about a roller 70 of the pivot vane 7, which adjoins the dividing gap 8 on the right as shown in FIG. 5, and the end surface 33 of the bobbin 2, that at this point is the trailing surface of the bobbin, is placed on the pivot vane 6, as also seen in FIG. 5. The roller 70, which acts similarly to the roller 60 described above, simultaneously acts as a stop for limiting the motion of the bobbin 2. During the entire pivoting operation, the roller 70 engages the shell or jacket surface or cone generatrix of the bobbin. Once again, it is noted that the receiving surface of the pivot vane 6 already comes to meet the supporting end surface 33 of the bobbin 2 during the tilting operation, and as a result makes the placement of the end surface 33 onto the path particularly gentle. In each case, the bobbin body 2 always remains supported on the receiving pivot vane during the tilting operation.

The transition between the states shown in FIGS. 5 and 6 is equivalent to that of FIGS. 2 and 3. Once again, the pivot vanes 6 and 7 are pivoted back into the position of repose in FIG. 6. The stop 6 at first remains in the downwardly pivoted position, so that the tilted bobbin 2 can be removed from the pivot vane 6 past the other pivot vane 7 and the adjoining roller conveyor.

The invention is not at all restricted only to the exemplary embodiment described above having the particular linkage 13 and the pivot vanes 6 and 7 as shown. Various versions of linkages are possible for moving or synchronizing the definitive path segments in two directions for the tilting operations.

For instance, the pivot vanes 6, 7 may be replaced by lifting platforms of suitable length, which are subjected to a vertical relative motion depending on the tilting direction. It is even sufficient to merely raise the respective active tilting edges or rollers 60, 70 with respect to the roller conveyor 1. The linkage can also be replaced by other elements, which are capable of raising at least the tilting edges or rollers 60 or 70 above the bearing surface on the path 1, depending on the required tilting direction. Instead of the roller conveyor 1, a slideway or even a path equipped with active transport elements, such as driven rollers, may be provided. In particular, the respectively active tilting rollers 60, 70 can be driven in order to reinforce the tilting and rolling functions. The removal of the bobbin can also be effected by active drive means. The stop 5 can be moved in and out from any arbitrary side, depending on given spatial conditions. The rhythm of motion of the path segments 6 and 7 and of the stop 5 can be synchronized or suitably retarded and may be adjustable.

It is clear that besides frustoconical bodies, other rotationally symmetrical bodies and even irregularly shaped bodies can be tilted in the manner described. The steps of the method and the function and construction of the apparatus in principle are independent of the particular shape of the body to be tilted. In this sense, the invention is basically universally applicable to all bodies that are to be turned or tilted in two opposite directions from a delivery position.

We claim:

1. Method for tilting substantially rotationally symmetrical bodies lying on a shell surface thereof onto an end surface thereof, which comprises:
    a) moving a substantially rotationally symmetrical body having a shell surface lying on a conveyor path in a given transport direction defining leading and trailing end surfaces of the body, until the body crosses a dividing plane extending transversely between and defining edges of two path segments of the conveyor path;
    b) stopping the body when the leading and trailing end surfaces are supported on different path segments;
    c) subsequently selectively raising the edge of one of the path segments relative to the other of the path segments, and tilting the body about the raised edge onto the other of the path segments until the end surface located above the other of the path segments comes to rest on the other of the path segments; and
    d) removing the tilted body in the given transport direction.

2. Method according to claim 1, which comprises supplying frustoconical bobbin bodies to the conveyor path as the bodies.

3. Method according to claim 1, which comprises tilting the body by pivoting the two transport path segments in the same pivoting direction about two parallel pivot pins extending transversely to the given conveying direction, and lowering the edge of the other of the path segments while raising the edge of the one path segment.

4. Method according to claim 2, which comprises pivoting the two conveyor path segments synchronously.

5. Method according to claim 3, which comprises pivoting the two conveyor path segments back into a starting position in a direction parallel to the given conveying direction, before removing the tilted body.

6. Method according to claim 3, which comprises radially guiding the body with the edge of the one path segment during tilting.

7. Method according to claim 5, which comprises radially guiding the body with the edge of the one path segment during at least one of tilting and pivoting back.

8. Method according to claim 1, which comprises moving a mechanical stop into the conveyor path after removing a tilted body, and moving the mechanical stop out of the conveyor path when beginning to raise the edge of the one path segment.

9. Method according to claim 1, which comprises tracing the body to be tilted and determining the end surface onto which the body is to be tilted according to a predetermined selection criterion no later than arrival of the body at the at the dividing plane, and selecting which path segment edge is to be raised as a function of the selection criterion for tilting the body onto the end surface determined by the selection criterion.

10. Method according to claim 9, which comprises selecting the larger end surface of the frustoconical body as the end surface to rest on the other of the path segments after tilting the body.

11. Apparatus for tilting bodies lying on a shell surface thereof onto one of two opposite end surfaces thereof, comprising:
   a conveyor path for delivering bodies having two opposite end surfaces and a shell surface lying on said conveyor path along a given path of motion in a given conveying direction to a turning point, said conveyor path being divided into two segments transversely to said given conveying direction in the vicinity of said turning point defining a tilting edge of each respective segment with a dividing line therebetween, said segments forming a flush bearing surface for the body to be tilted in a position of repose;
   stop means, means for moving said stop means into said given path of motion for stopping the body approximately centrally above said dividing line at said turning point with the end surfaces of the body disposed above different conveyor path segments; and
   means for alternatively raising one of said tilting edges relative to the other of said tilting edges for tilting the body about said raised tilting edge and placing said end surface of the body above the other of said conveyor path segments onto the other of said conveyor path segments.

12. Apparatus according to claim 11, wherein the bodies are frustoconical bobbin bodies.

13. Apparatus according to claim 11, wherein said conveyor path is a roller conveyor and said tilting edges are rollers having parallel bearing shafts, said rollers defining said conveyor path segments at said dividing line.

14. Apparatus according to claim 11, wherein said conveyor path segments are pivot vanes having mutually parallel pivot pins extending transversely to said given conveying direction.

15. Apparatus according to claim 14, including means for operatively coupling and synchronously pivoting said pivot vanes in the same pivoting direction.

16. Apparatus according to claim 15, wherein said pivot vanes have substantially parallel bearing surfaces.

17. Apparatus according to claim 16, wherein said body has a transverse axis passing through the end surfaces thereof, said given conveying direction has a given inclination relative to the horizontal for accelerating motion of the bodies due to the force of gravity, and said bearing surface of said pivot vane forming the other of said conveyor path segments receiving the end surface of the turned body has an inclination opposite to said given inclination for limiting tilting of the body about the transverse axis of the body to less than 90°.

18. Apparatus according to claim 16, wherein said conveyor path has a remaining portion adjoining said pivot vanes, and including means for returning said pivot vanes to the position of repose after tilting the body, with said bearing surfaces of said two pivot vanes aligned with said remaining portion of said conveyor path.

19. Apparatus according to claim 11, wherein said stop means are are operatively coupled to said two conveyor path segments.

20. Apparatus according to claim 11, including a tracer device for tracing the body along the given path of motion prior to reaching said stop means.

21. Apparatus according to claim 20, including a reversing device being actuated as a function of said tracer device for reversing the direction of motion of said two tilting edges.

22. Apparatus for tilting frustoconical bobbin bodies lying on a shell surface thereof onto one of two opposite end surfaces thereof, comprising:
   a conveyor path for delivering bobbin bodies having two opposite end surfaces and a shell surface lying on said conveyor path along a given path of motion in a given conveying direction to a turning point, said conveyor path being divided into two segments transversely to said given conveying direction in the vicinity of said turning point defining a tilting edge of each respective segment with a dividing line therebetween, said segments forming a flush bearing surface for the bobbin body to be tilted in a position of repose;
   stop means, means for moving said stop means into said given path of motion for stopping the bobbin body approximately centrally above said dividing line at said turning point with the end surfaces of the bobbin body disposed above different conveyor path segments; and
   means for alternatively raising one of said tilting edges relative to the other of said tilting edges for tilting the bobbin body about said raised tilting edge and placing said end surface of the bobbin body above the other of said conveyor path segments onto the other of said conveyor path segments.

* * * * *